United States Patent
Bone et al.

(10) Patent No.: US 9,455,931 B2
(45) Date of Patent: *Sep. 27, 2016

(54) LOAD BALANCING BETWEEN PROCESSORS

(71) Applicant: Amazon Technologies, Inc., Seattle, WA (US)

(72) Inventors: Ian M. Bone, Seattle, WA (US); Eden Ashley Jn Baptiste, Orlando, FL (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/717,579

(22) Filed: May 20, 2015

(65) Prior Publication Data

US 2015/0256485 A1 Sep. 10, 2015

Related U.S. Application Data

(63) Continuation of application No. 14/457,264, filed on Aug. 12, 2014, now Pat. No. 9,052,959, and a continuation of application No. 12/967,171, filed on Dec. 14, 2010, now Pat. No. 8,830,245.

(51) Int. Cl.
| | |
|---|---|
| *G06F 15/16* | (2006.01) |
| *G06T 1/00* | (2006.01) |
| *G06F 15/00* | (2006.01) |
| *H04L 12/927* | (2013.01) |
| *G06F 9/50* | (2006.01) |
| *H04L 12/911* | (2013.01) |
| *H04L 29/08* | (2006.01) |

(52) U.S. Cl.
CPC ........... *H04L 47/803* (2013.01); *G06F 9/5044* (2013.01); *G06F 9/5088* (2013.01); *H04L 47/726* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 8,199,158 B2 | 6/2012 | Samson et al. | |
| 8,284,205 B2* | 10/2012 | Miller | G06F 1/3203 345/501 |
| 8,610,725 B2* | 12/2013 | Sandmel | G06T 15/005 345/501 |
| 8,610,727 B1* | 12/2013 | Bao | G06F 9/5044 345/502 |
| 2006/0242647 A1* | 10/2006 | Kimbrel | G06F 9/5083 718/104 |
| 2009/0016430 A1* | 1/2009 | Schmit | H04N 19/176 375/240.01 |

(Continued)

OTHER PUBLICATIONS

International Search Report and Written Opinion, dated Apr. 17, 2012 for PCT/US 11/64348.

*Primary Examiner* — Jacinta M Crawford

(74) *Attorney, Agent, or Firm* — Thomas | Horstemeyer LLP; Michael J. D'Aurelio; Jason M. Perilla

(57) ABSTRACT

Disclosed are various embodiments for facilitating load balancing between a first processor and a second processor in at least one computing device. A request is obtained to execute a first application in the at least one computing device. In one embodiment, a second application associated with the first application is assigned to be executed in the second processor instead of the first processor when a resource usage profile associated with the first application indicates that the first application imposes a greater load on the first processor than the second processor. Conversely, the second application is assigned to be executed in the first processor instead of the second processor when the resource usage profile indicates that the first application imposes a greater load on the second processor than the first processor.

20 Claims, 4 Drawing Sheets

(56) References Cited

U.S. PATENT DOCUMENTS

| | | |
|---|---|---|
| 2009/0027403 A1 | 1/2009 | Jung |
| 2009/0256855 A1 | 10/2009 | Tran |
| 2009/0307699 A1 | 12/2009 | Munshi et al. |
| 2010/0153758 A1 | 6/2010 | Esliger et al. |
| 2011/0102443 A1 | 5/2011 | Dror et al. |
| 2011/0157195 A1* | 6/2011 | Sprangle .......... G06T 1/20 345/522 |

* cited by examiner

LOAD BALANCING BETWEEN PROCESSORS

CROSS-REFERENCE TO RELATED APPLICATIONS

This application is a continuation of U.S. patent application Ser. No. 12/967,171, titled "LOAD BALANCING BETWEEN GENERAL PURPOSE PROCESSORS AND GRAPHICS PROCESSORS," filed Dec. 14, 2010, and a continuation of U.S. patent application Ser. No. 14/457,264, titled "LOAD BALANCING BETWEEN GENERAL PURPOSE PROCESSORS AND GRAPHICS PROCESSORS," filed Aug. 12, 2014, the entire contents of both of which applications are hereby incorporated herein by reference.

BACKGROUND

Graphics processing units (GPUs) are specialized processors for graphics-related operations. Many computing devices include one or more GPUs in order to offload and accelerate rendering of 2D and/or 3D graphics. The highly parallel structure of a GPU may make the GPU more effective than general purpose processors such as central processing units (CPUs) for a variety of complex algorithms. Computer games, in particular, often benefit from GPU availability in a computing device.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The present disclosure relates to facilitating load balancing of applications between central processing units (CPUs) and graphics processing units (GPUs). Some applications, such as, for example, game applications, may tend to impose either a greater CPU load or a greater GPU load within a computing device. In other words, some applications may be classified as either CPU intensive or GPU intensive. Various embodiments of the present disclosure assign applications to execute in computing devices that are selected based at least in part on the current CPU and GPU loads of the computing devices and CPU and GPU resource usage of the applications. In addition, some applications, or portions of applications, may be assigned to execute in either a CPU or a GPU based at least in part on the current CPU and GPU loads of the computing devices. Accordingly, the CPU and GPU resources of the computing devices may be more fully utilized than otherwise would be possible. In the following discussion, a general description of the system and its components is provided, followed by a discussion of the operation of the same.

Figure 1:
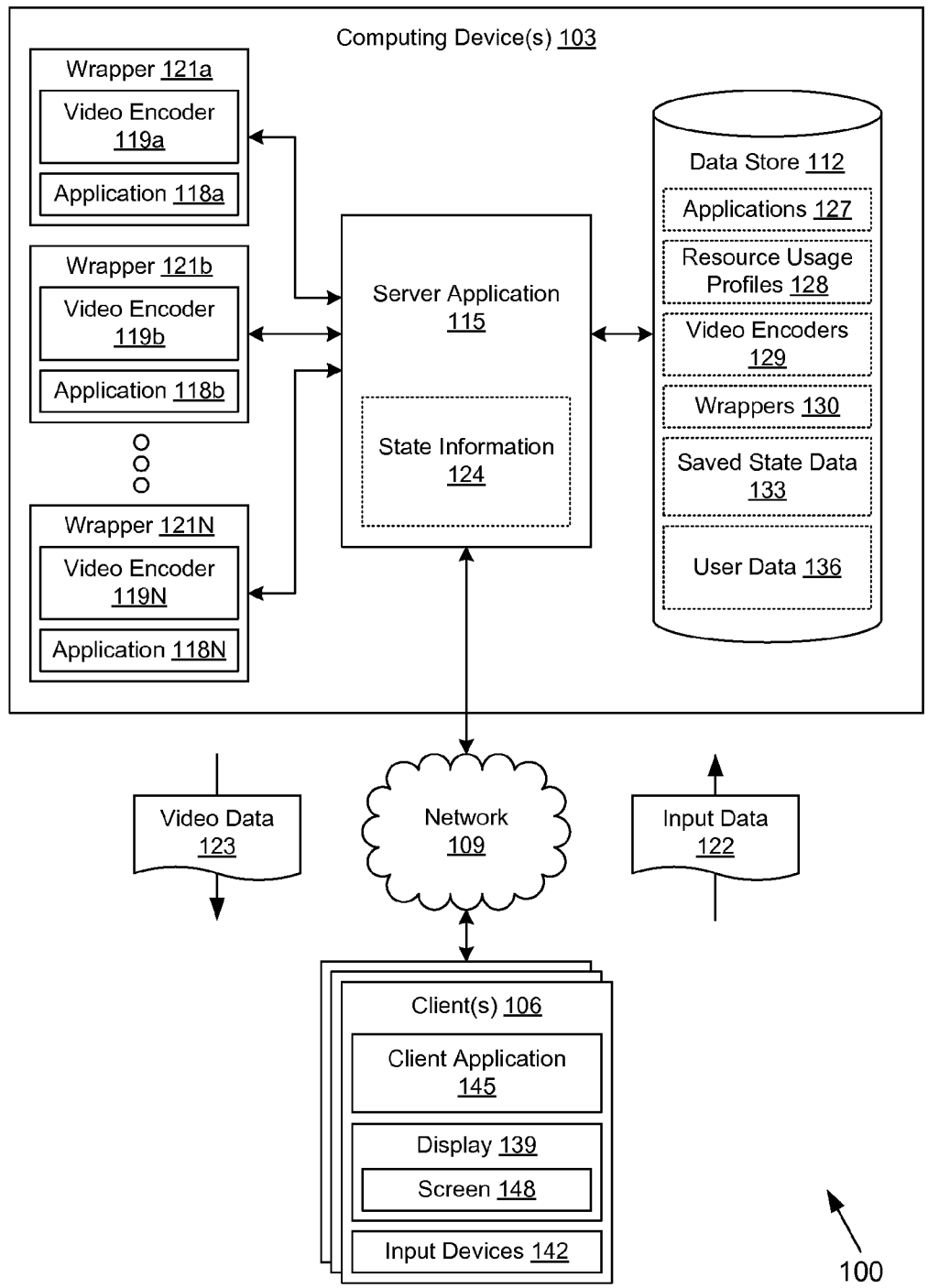
FIG. 1 is a drawing of a networked environment according to various embodiments of the present disclosure.

With reference to FIG. 1, shown is a networked environment 100 according to various embodiments. The networked environment 100 includes one or more computing devices 103 in data communication with one or more clients 106 by way of a network 109. The network 109 includes, for example, the Internet, intranets, extranets, wide area networks (WANs), local area networks (LANs), wired networks, wireless networks, or other suitable networks, etc., or any combination of two or more such networks.

The computing device 103 may comprise, for example, a server computer or any other system providing computing capability. Alternatively, a plurality of computing devices 103 may be employed that are arranged, for example, in one or more server banks or computer banks or other arrangements. For example, a plurality of networked computing devices 103 together may comprise a cloud computing resource, a grid computing resource, and/or any other distributed computing arrangement. Such computing devices 103 may be located in a single installation or may be distributed among many different geographical locations. For purposes of convenience, the computing device 103 is referred to herein in the singular. Even though the computing device 103 is referred to in the singular, it is understood that a plurality of computing devices 103 may be employed in the various arrangements as described above.

Various applications and/or other functionality may be executed in the computing device 103 according to various embodiments. Also, various data is stored in a data store 112 that is accessible to the computing device 103. The data store 112 may be representative of a plurality of data stores 112 as can be appreciated. The data stored in the data store 112, for example, is associated with the operation of the various applications and/or functional entities described below.

The components executed on the computing device 103, for example, include a server application 115, a plurality of applications 118a, 118b . . . 118N, a plurality of video encoders 119a, 119b . . . 119N, a plurality of wrappers 121a, 121b . . . 121N, and other applications, services, processes, systems, engines, or functionality not discussed in detail herein. The server application 115 may correspond, for example, to a game server application or another type of application session server. The server application 115 is executed to launch applications 118, which may be executed within wrappers 121 that provide a virtualized environment. The server application 115 is also executed to obtain input data 122 from the clients 106 and provide the input data 122 to the respective wrapper 121.

The server application 115 is also executed to send video data 123 that is captured from the application 118 to the clients 106. The server application 115 may communicate with the client 106 over various protocols such as, for example, hypertext transfer protocol (HTTP), simple object access protocol (SOAP), representational state transfer (REST), real-time transport protocol (RTP), real time streaming protocol (RTSP), real time messaging protocol (RTMP), user datagram protocol (UDP), transmission control protocol (TCP), and/or other protocols for communicating data over the network 109. The server application 115 is configured to maintain state information 124 associated with the executing applications 118.

The application 118 may correspond, for example, to a game or another type of application. As non-limiting examples, the application 118 may correspond to a firstperson shooter game, an action game, an adventure game, a party game, a role-playing game, a simulation game, a strategy game, a vehicle simulation game, and/or other types of games. The application 118 may be a game originally designed for execution in a general-purpose computing device or in a specialized video game device such as, for example, a video game console, a handheld game device, an arcade game device, etc. The applications 118 may also correspond to mobile phone applications, computer-aided design (CAD) applications, computer-aided manufacturing (CAM) applications, photo manipulation applications, video editing applications, office productivity applications, operating systems and associated applications, emulators for operating systems, architectures, and capabilities not present on a consumer device, and other applications and combinations of applications.

The application 118 may expect to access one or more resources of the device on which it is executed. Such resources may correspond to display devices, input devices, or other devices. In some cases, the application 118 may request exclusive access to one or more of the resources, whereby no other applications may have access to the particular resources. Various applications 118 may use more GPU resources than CPU resources, or more CPU resources than GPU resources.

The video encoder 119 is able to encode a video signal generated by the application 118 into a video stream for transmission over the network 109 to clients 106. The video stream may include an audio signal generated by the application 118 as well. To this end, the video encoder 119 may include various types of video and audio encoders, such as, for example, Moving Pictures Experts Group (MPEG) encoders, H.264 encoders, Flash® video encoders, etc. Such encoders may be selected according to factors such as, for example, data reduction, encoding quality, latency, etc. Various video encoders 119 may be configured to execute in one or more GPUs or one or more CPUs. In various embodiments, the computing device 103 may include one or more dedicated hardware video encoders upon which the video encoder 119 may be executed. Such hardware video encoders may be employed when available.

The wrapper 121 corresponds to an application that provides a virtualized environment for execution of the application 118. In particular, the wrapper 121 may be configured to virtualize one or more of the resources that the application 118 expects to access. Such resources may include a keyboard, a mouse, a joystick, a video device, a sound device, etc. In this way, the wrapper 121 is able to provide input commands to application 118 as if the wrapper 121 emulates a keyboard, a mouse, or another type of input device.

Different types of wrappers 121 may be provided for different applications 118 or classes of applications 118. As non-limiting examples, different wrappers 121 may be provided for applications 118 using different application programming interfaces (APIs) such as OpenGL®, DirectX®, the Graphics Device Interface (GDI), and so on. The wrapper 121 may include an operating system specific to the applications 118 to be executed. Where the application 118 comprises a mobile phone application, for example, the wrapper 121 may include the Android operating system or another operating system. Where the application 118 is configured for execution in a specialized video game device or another type of computing device, the wrapper 121 may include an emulation application that emulates the device. The wrapper 121 may be configured to deliver the video signal generated by the application 118 to the video encoder 119 for encoding. Various wrappers 121 in association with the applications 118 may use more GPU resources than CPU resources, or more CPU resources than GPU resources.

The state information 124 that is maintained by the server application 115 includes various data relating to application sessions that are currently active. For example, the state information 124 may track the users that are currently participating in the application session, status information associated with the users, security permissions associated with the application session (e.g., who can or cannot join), and so on. In some embodiments, some or all of the state information 124 may be discarded when an application session ends.

The data stored in the data store 112 includes, for example, applications 127, resource usage profiles 128, video encoders 129, wrappers 130, saved state data 133, user data 136, and potentially other data. The applications 127 correspond to a library of applications that are available to be launched as applications 118. The applications 127 may correspond to executable code within the computing device 103. Alternatively, the applications 127 may correspond to code that is executable within another type of device but is not executable within the computing device 103. Such applications 127 may be referred to as "binaries," read-only memory images (ROMs), and other terms. A particular application 127 may be executed as multiple instances of the applications 118 for multiple application sessions.

The resource usage profiles 128 describe a respective resource usage profile 128 for each of the applications 127. Each resource usage profile 128 indicates whether the respective application 127 tends to use more CPU resources or GPU resources. Some applications 127 tend to be more CPU intensive, while other applications 127 tend to be more GPU intensive. For example, a resource usage profile 128 may indicate percentages of CPU or GPU typically consumed by the respective application 127. Where an application 127 is to be executed in conjunction with an emulation application, the resource usage profile 128 may also reflect resources consumed by the emulation application. In some embodiments, the resource usage profile 128 may also reflect resources consumed by a wrapper 130. In various embodiments, the resource usage profile 128 may describe the memory consumption profile of an application 127.

The video encoders 129 correspond to the various types of video encoders 119 that may be employed in the computing device 103. Some video encoders 129 may correspond to specific formats, such as, for example, H.264, MPEG-4, MPEG-2, and/or other formats. Some video encoders 129 may be executed in GPUs, some video encoders 129 may be executed in CPUs, and some video encoders 129 may be executed in both GPUs and CPUs. The wrappers 130 correspond to the executable code that implements the various types of wrappers 121. The wrappers 130 are executable in the computing device 103 and may be executed as multiple instances of the wrappers 121 for multiple application sessions.

The saved state data 133 corresponds to application states that have been saved by the applications 118. Because the applications 118 are executed in a virtualized environment, the applications 118 may write state information to a virtual location, which is then mapped for storage in the data store 112 as the saved state data 133. The saved state data 133 may correspond to data saved normally by the application 118 or may correspond to a memory image of the application 118 that may be resumed at any time. The user data 136 includes various data related to the users of the applications 118, such as, for example, security credentials, application preferences, billing information, a listing of other users that are permitted to join application sessions started by the user, and so on.

The client 106 is representative of a plurality of client devices that may be coupled to the network 109. The clients 106 may be geographically diverse. The client 106 may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices with like capability.

The client 106 may include a display 139. The display 139 may comprise, for example, one or more devices such as cathode ray tubes (CRTs), liquid crystal display (LCD) screens, gas plasma-based flat panel displays, LCD projectors, or other types of display devices, etc. The client 106 may include one or more input devices 142. The input devices 142 may comprise, for example, devices such as keyboards, mice, joysticks, accelerometers, light guns, game controllers, touch pads, touch sticks, push buttons, optical sensors, microphones, webcams, and/or any other devices that can provide user input.

The client 106 may be configured to execute various applications such as a client application 145 and/or other applications. The client application 145 is executed to allow a user to launch, join, play, and otherwise interact with an application 118 executed in the computing device 103. To this end, the client application 145 is configured to capture input provided by the user through one or more of the input devices 142 and send this input over the network 109 to the computing device 103 as input data 122.

The client application 145 is also configured to obtain video data 123 over the network 109 from the computing device 103 and render a screen 148 on the display 139. To this end, the client application 145 may include one or more video and audio players to play out a video stream generated by a video encoder 119. In one embodiment, the client application 145 comprises a plug-in within a browser application. The client 106 may be configured to execute applications beyond the client application 145 such as, for example, browser applications, email applications, instant message applications, and/or other applications.

Figure 2:
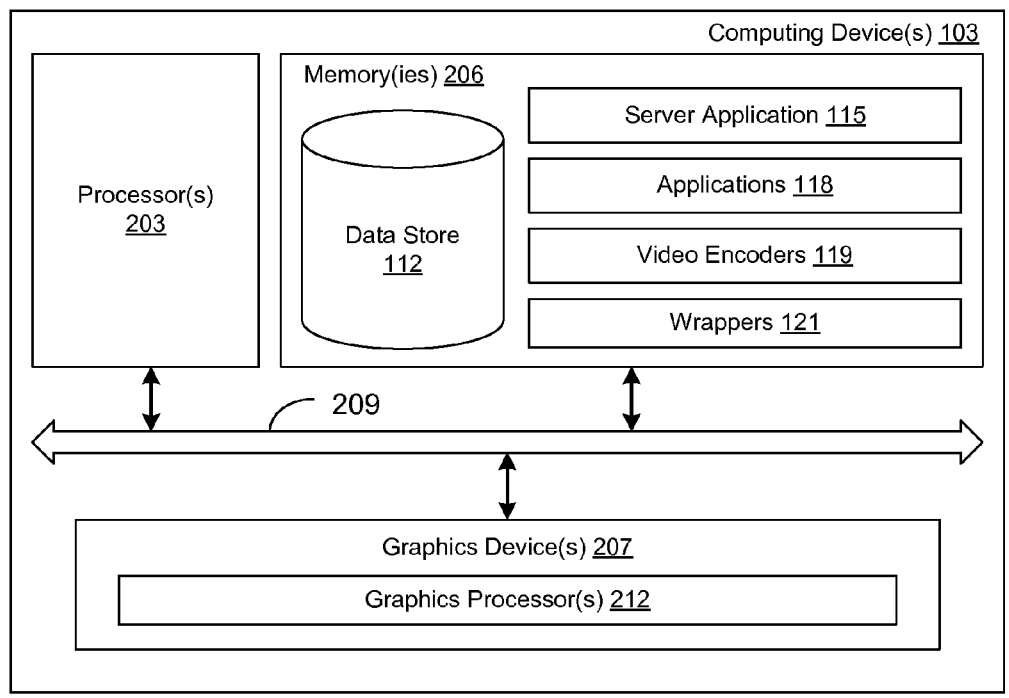
FIG. 2 is a schematic block diagram that provides one example illustration of a computing device employed in the networked environment of FIG. 1 according to various embodiments of the present disclosure.

Referring next to FIG. 2, shown is a schematic block diagram of the computing device 103 according to an embodiment of the present disclosure. The computing device 103 includes at least one processor circuit, for example, having a processor 203, a memory 206, and one or more graphics devices 207, all of which are coupled to a local interface 209. To this end, the computing device 103 may comprise, for example, at least one server computer or like device. The local interface 209 may comprise, for example, a data bus with an accompanying address/control bus or other bus structure as can be appreciated. The graphics devices 207 may correspond to high-performance graphics hardware, including one or more graphics processors 212. Non-limiting examples of commercially available graphics processors 212 include the NVIDIA® Tesla series. The graphics devices 207 are configured to render graphics corresponding to the applications 118 executed in the computing device 103. In one embodiment, a graphics device 207 may correspond to a dedicated hardware video encoder.

Stored in the memory 206 are both data and several components that are executable by the processor 203. In particular, stored in the memory 206 and executable by the processor 203 are the server application 115, the application 118, the video encoders 119, the wrappers 121, and potentially other applications. Also stored in the memory 206 may be a data store 112 and other data. In addition, an operating system may be stored in the memory 206 and executable by the processor 203.

It is understood that there may be other applications that are stored in the memory 206 and are executable by the processors 203 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Delphi®, Flash®, or other programming languages.

Next, with reference to both FIGS. 1 and 2, a general description of the operation of the various components of the networked environment 100 is provided. To begin, a user at a client 106 sends a request to launch an application 118 to the server application 115. The server application 115 obtains the corresponding application 127 and wrapper 130 from the data store 112. The server application 115 then launches the application 118 in the corresponding wrapper 121. The server application 115 may track the status of the application within the state information 124.

The application 118 may be launched in a specific one of the computing devices 103 based in part on a resource usage profile 128 associated with the application 118. The resource usage profile 128 may indicate that the application 118 has a tendency to use more resources of the processor(s) 203 compared to the resources of the graphics processor(s) 212. Alternatively, the resource usage profile 128 may indicate that the application 118 has a tendency to use more resources of the graphics processor(s) 212 compared to the resources of the processor(s) 203.

Thus, the server application 115 may be able to match the application 118 to a specific one of the computing devices 103 according to the resource load of one of the computing devices 103. As a non-limiting example, an application 118 that tends to be CPU intensive may be assigned to a computing device 103 with ample CPU capacity. As another non-limiting example, an application 118 that tends to be GPU intensive may be assigned to a computing device 103 with ample GPU capacity. In one embodiment, the applications 118 may be assigned to maintain approximately even GPU and CPU usage within a threshold range across the computing devices 103. Further, the applications 118 may be assigned to maximize resource usage so that the number of computing devices 103 in use is minimized.

In addition, the video encoder 119 may be configured to execute in either the processor(s) 203 or the graphics processor(s) 212. In one embodiment, the video encoder 119 is configured to use the opposite resource from the corresponding application 118. For example, if an application 118 is CPU intensive, the video encoder 119 may be configured to use GPUs. Conversely, if an application 118 is GPU intensive, the video encoder 119 may be configured to use CPUs. Accordingly, the resource usage associated with the application 118, including the video encoder 119, may be evened out.

Also, video encoders 119 that are currently executing may be transferred from CPUs to GPUs and vice versa based at least in part on the resource load of the computing device 103 or when certain criteria are met. As a non-limiting example, a video encoder 119 executing in a GPU may be reconfigured to execute in a CPU when the current GPU load meets a threshold. As another non-limiting example, a video encoder 119 executing in a CPU may be reconfigured to execute in a GPU when the current CPU load meets a threshold.

Such transfers of video encoders 119 may be facilitated by a virtualization layer. Such a virtualization layer, for example, may make it appear that the video encoder 119 is executed in a virtual device or includes a virtual encoding device, which may be mapped either to processors 203 or graphics processors 212. By reconfiguring and transferring video encoders 119, the balance of load between processors 203 and graphics processors 212 may be altered in such a way as to accommodate an additional application 118 and associated applications. In one embodiment, when the execution of the video encoder 119 is transferred, the video stream generated by the video encoder 119 is uninterrupted.

In various embodiments, the quality of the video stream generated by the video encoder 119 may be adjusted, for example, to manage server-side resource usage. The quality of the video stream may also be adjusted to account for traffic on the network 109. Furthermore, the quality of the video stream may be adjusted depending on the ability of the client 106 to decode the video stream.

The wrapper 121 provides a virtualized environment for the application 118 that virtualizes one or more resources of the computing device 103. Such resources may include exclusive resources, i.e., resources for which the application 118 requests exclusive access. For example, the application 118 may request full screen access from a video device, which is an exclusive resource because normally only one application can have full screen access. Furthermore, the wrapper may virtualize input devices such as, for example, keyboards, mice, etc., which may not actually be present in the computing device 103. In various embodiments, the wrapper 121 may correspond to a virtual machine and/or the wrapper 121 may be executed within a virtual machine.

The user at the client 106 enters input commands for the application 118 by use of the input devices 142 of the client 106. As a non-limiting example, the user may depress a left mouse button. Accordingly, the client application 145 functions to encode the input command into a format that may be transmitted over the network 109 within the input data 122. The server application 115 receives the input command and passes it to the wrapper 121. The wrapper 121 then provides a left mouse button depression to the application 118 by way of a virtualized mouse. In some embodiments, different input commands may be presented to the application 118 from those that were generated by a client 106. As a non-limiting example, if a user sends a mouse down command and the client application 145 loses focus, the wrapper 121 may be configured to send a mouse down command followed by a mouse up command. In various embodiments, the input commands may be relayed to the wrapper 121 as soon as possible, or the input commands may be queued by the wrapper 121 and relayed to the application 118 sequentially from the queue according to another approach.

Meanwhile, the graphical output of the application 118 is captured by the wrapper 121 and encoded into a video stream. Additionally, the audio output of the application 118 may be captured and multiplexed into the video stream. The video stream is transmitted by the server application 115 to the client 106 over the network 109 as the video data 123. The client application 145 obtains the video data 123 and plays it out on the display 139 in a screen 148.

Various embodiments enable input generated through one type of input device 142 in a client 106 to be transformed by the wrapper 121 into input commands provided to the application 118 through an entirely different type of virtual input device. As a non-limiting example, input generated by an accelerometer in the client 106 may be translated by the wrapper 121 into input provided through a virtual mouse. Thus, completely different kinds of input devices 142 may be used in providing input to the application 118 that may not have been contemplated when the application 118 was implemented.

Moreover, because the client 106 is decoupled from the hardware requirements of the application 118, the application 118 may be used on a diverse variety of clients 106 that are capable of streaming video with acceptable bandwidth and latency over a network 109. For example, a game that requires substantial graphics rendering resources may be played on a client 106 that is a smartphone. Thus, the client 106 need not include expensive graphics hardware to perform the complex three-dimensional rendering that may be necessary to execute the application 118. By contrast, the hardware of the computing device 103 may be upgraded, as needed, to meet the hardware requirements of the latest and most computationally intensive applications 118. In various embodiments, the video stream encoded by the video encoder 119 may be scaled according to the bitrate and/or other characteristics of the connection between the computing device 103 and the client 106 over the network 109.

Another specific non-limiting example of an application 118 may include a mobile phone application. A customer at a client 106 may wish to browse the features and capabilities of various mobile phones. A wrapper 121 may execute a mobile phone application within a mobile phone operating system. The video signal generated by the mobile phone application may be captured and sent as a video stream to the client 106. Accordingly, a user is able to test and interact with actual mobile phone applications within any client 106 without the specific mobile phone hardware.

It is understood that the principles of the present disclosure may apply to a variety of applications that may use processor(s) 203 and/or graphics processor(s) 212. Furthermore, although video encoders 119 are discussed as a specific example of another application that operates in conjunction with the applications 118, it is understood that the principles of the present disclosure may apply to a variety of applications that may be configured to execute on either processor(s) 203 or graphics processor(s) 212. Another non-limiting example may involve an application that renders graphics for use in motion pictures or television.

Figure 3:
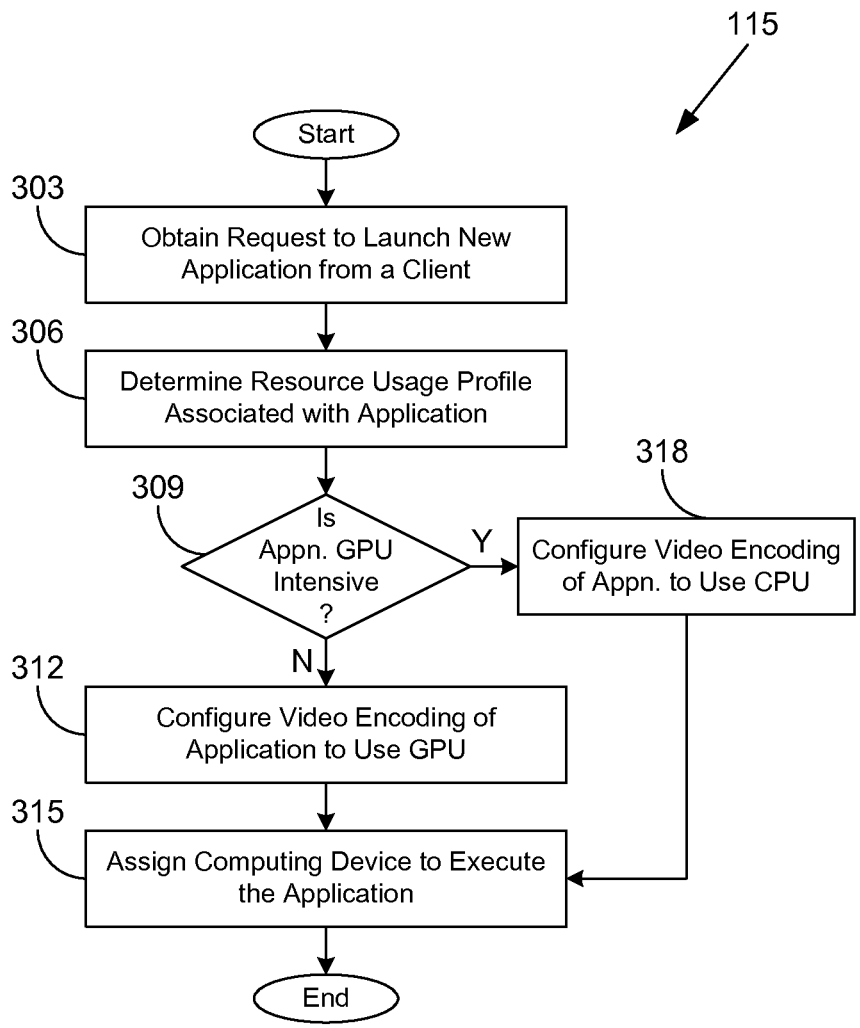
FIGS. 3 and 4 are flowcharts illustrating examples of functionality implemented as portions of a server application executed in a computing device in the networked environment of FIG. 1 according to various embodiments of the present disclosure.

Continuing on to FIG. 3, shown is a flowchart that provides one example of the operation of a portion of the server application 115 according to various embodiments. It is understood that the flowchart of FIG. 3 provides merely an example of the many different types of functional arrangements that may be employed to implement the operation of the portion of the server application 115 as described herein. As an alternative, the flowchart of FIG. 3 may be viewed as depicting an example of steps of a method implemented in the computing device 103 (FIG. 1) according to one or more embodiments.

Beginning with box 303, the server application 115 obtains a request to launch a new application 118 (FIG. 1) from a client 106 (FIG. 1). In box 306, the server application 115 determines a resource usage profile 128 (FIG. 1) associated with the application 118. In box 309, the server application 115 determines from the resource usage profile 128 whether the application 118 is classified as GPU intensive.

If the application 118 is not classified as GPU intensive, the application 118 may be classified as CPU intensive and the server application 115 proceeds to box 312. In box 312, the server application 115 configures the video encoder 119 (FIG. 1) for the application 118 to be executed in a graphics processor 212 (FIG. 2) rather than a processor 203 (FIG. 2). In box 315, the server application 115 assigns one of the computing devices 103 to execute an instance of the application 118 along with the video encoder 119 and any wrappers 121 (FIG. 1). Where the computing device 103 comprises a cloud computing resource, the specific computing device 103 to which the application 118 is assigned may comprise a virtual machine instance in the cloud computing resource. The functionality of assigning an application 118 to a computing device 103 will be further described in connection with the flowchart of FIG. 4. Thereafter, the portion of the server application 115 ends.

If the application 118 is classified as GPU intensive in box 309, the server application 115 proceeds to box 318 and configures the video encoder 119 for the application 118 to be executed in a processor 203 rather than a graphics processor 212. The server application 115 then continues to box 315 and assigns one of the computing devices 103 to execute an instance of the application 118 along with the video encoder 119 and any wrappers 121. Thereafter, the portion of the server application 115 ends.

Figure 4:
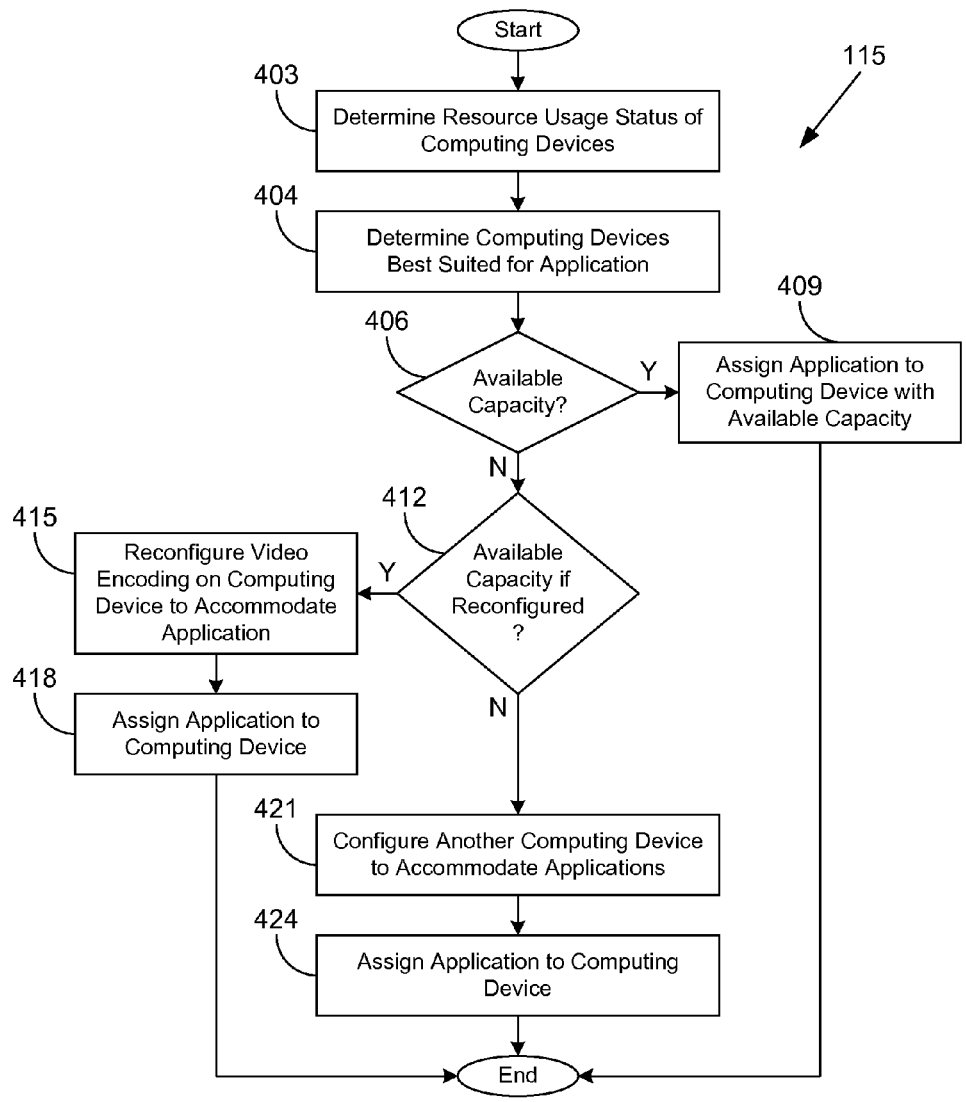

Turning now to FIG. 4, shown is a flowchart that provides another example of the operation of another portion of the server application 115 according to various embodiments. In particular, the functionality shown in FIG. 4 provides one example of assigning a new instance of an application 118 (FIG. 1) to a specific computing device 103 (FIG. 1). It is understood that the flowchart of FIG. 4 provides merely an example of the many different types of functional arrangements that may be employed to implement the operation of the portion of the server application 115 as described herein. As an alternative, the flowchart of FIG. 4 may be viewed as depicting an example of steps of a method implemented in the computing device 103 according to one or more embodiments.

Beginning with box 403, the server application 115 determines the resource usage status of the computing devices 103. Where the computing device 103 comprises a cloud computing resource, the resource usage status may be determined for virtual machine instances executing in the cloud computing resource. The resource usage status may indicate a load associated with one or more processors 203 (FIG. 2), a load associated with one or more graphics processors 212 (FIG. 2), and/or other resource usage information. In box 404, the server application 115 determines the computing devices 103 that are best suited for executing the particular application 118 (FIG. 1). For example, an application 118 may have very high graphics rendering demands, and computing devices 103 that are configured with superior hardware-based graphics acceleration may be best suited for executing the application 118.

In box 406, the server application 115 determines whether any one of the computing devices 103 that are currently allocated to application(s) 118 have available capacity to accommodate a new instance of an application 118. In one embodiment, the server application 115 may examine the resource usage profile 128 (FIG. 1) to determine an expected amount of resource consumption associated with the application 118. In another embodiment, the server application 115 may use a reference amount of resource consumption in determining the computing capacity necessary to execute the application 118.

Whether the video encoder 119 (FIG. 1) associated with the application 118 may be configured to execute in a graphics processor 212 or a processor 203 may allow the application 118 to be executed in computing devices 103 with varying mixtures of CPU and GPU loads. In other words, if a computing device 103 has more available CPU resources, the video encoder 119 may be configured to be executed in a processor 203. Conversely, if a computing device 103 has more available GPU resources, the video encoder 119 may be configured to be executed in a graphics processor 212.

If a computing device 103 has available capacity, the server application 115 assigns the application 118 to be executed in a computing device 103 with available capacity in box 409. In one embodiment, the computing device 103 may be selected when the current GPU load is below a maximum threshold for GPU usage and the resource usage profile associated with the application 118 indicates that the application 118 tends to use more GPU resources than CPU resources. Alternatively, the computing device 103 may be selected when a current CPU load is below a maximum threshold for CPU usage and the resource usage profile associated with the application 118 indicates that the application 118 tends to use more CPU resources than GPU resources. Consequently, the application 118 may be assigned to computing devices 103 with a goal of maximizing utilization of processors 203 and/or graphics processors 212.

In one embodiment, the computing device 103 may be selected when the current GPU load meets a maximum threshold for GPU usage and the resource usage profile associated with the application 118 indicates that the application 118 tends to use more CPU resources than GPU resources. Alternatively, the computing device 103 may be selected when a current CPU load meets a maximum threshold for CPU usage and the resource usage profile associated with the application 118 indicates that the application 118 tends to use more GPU resources than CPU resources. Accordingly, when either the processors 203 or the graphics processors 212 are currently sufficiently loaded, the spare capacity of the others may be used. Once the application 118 is assigned to a computing device 103, the portion of the server application 115 ends.

However, if the server application 115 determines in box 406 that none of the computing devices 103 currently allocated to applications 118 has available capacity to accommodate the new instance of an application 118, the server application 115 instead moves to box 412. In box 412, the server application 115 determines whether any of the computing devices 103 would have available capacity if reconfigured. As a non-limiting example, the video encoders 119 executing on a computing device 103 may be executing through a virtualization layer that allows execution of the video encoders 119 to be transferred from a graphics processor 212 to a processor 203 and vice versa. Such reconfiguration may allow for sufficient processing capacity to be freed up for the particular application 118.

If the server application 115 determines that a computing device 103 would have available capacity if reconfigured, the server application 115 moves to box 415 and reconfigures the video encoders 119 executed on the computing device 103 in order to accommodate the new instance of the application 118. In box 418, the server application 115 assigns the new instance of the application 118 to the computing device 103 that has been reconfigured. Thereafter, the portion of the server application 115 ends.

If the server application 115 instead determines in box 412 that no computing device 103 would have available capacity even if reconfigured, the server application 115 proceeds to box 421. In box 421, the server application 115 configures or allocates another computing device 103 to accommodate applications 118. In other words, an unallocated one of the computing devices 103 is selected for the application 118 when no other allocated one of the computing devices 103 has sufficient processing resources to accommodate the application 118.

Where the computing device 103 comprises a cloud computing resource, the server application 115 may configure a new virtual machine instance to accommodate applications 118. Because the available capacity of the existing computing devices 103 is used first, the allocation of additional computing devices 103 may be minimized, thereby reducing costs. In box 424, the server application 115 assigns the new instance of the application 118 to be executed in the newly allocated computing device 103. Thereafter, the portion of the server application 115 ends.

Referring back to FIG. 2, a number of software components are stored in the memory 206 and are executable by the processor 203. In this respect, the term "executable" means a program file that is in a form that can ultimately be run by the processor 203. Examples of executable programs may be, for example, a compiled program that can be translated into machine code in a format that can be loaded into a random access portion of the memory 206 and run by the processor 203, source code that may be expressed in proper format such as object code that is capable of being loaded into a random access portion of the memory 206 and executed by the processor 203, or source code that may be interpreted by another executable program to generate instructions in a random access portion of the memory 206 to be executed by the processor 203, etc. An executable program may be stored in any portion or component of the memory 206 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 206 is defined herein as including both volatile and nonvolatile memory and data storage components. Volatile components are those that do not retain data values upon loss of power. Nonvolatile components are those that retain data upon a loss of power. Thus, the memory 206 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 203 may represent multiple processors 203 and the memory 206 may represent multiple memories 206 that operate in parallel processing circuits, respectively. In such a case, the local interface 209 may be an appropriate network 109 (FIG. 1) that facilitates communication between any two of the multiple processors 203, between any processor 203 and any of the memories 206, or between any two of the memories 206, etc. The local interface 209 may comprise additional systems designed to coordinate this communication, including, for example, performing load balancing. The processor 203 may be of electrical or of some other available construction.

Although the server application 115, the applications 118, the video encoders 119, the wrappers 121, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3 and 4 show the functionality and operation of an implementation of portions of the server application 115. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 203 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the server application 115, the applications 118, the video encoders 119, and the wrappers 121, that comprises software or code can be embodied in any non-transitory computer-readable medium for use by or in connection with an instruction execution system such as, for example, a processor 203 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media.

More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, at least the following is claimed:

1. A non-transitory computer-readable medium embodying a program that, when executed by at least one computing device, directs the at least one computing device to perform a method comprising:
   obtaining, by the at least one computing device, a request to execute an application, the application being associated with a resource usage profile;
   selecting, by the at least one computing device, a machine instance from among a plurality of machine instances for execution of the application based at least in part on a processing load of the machine instance and the resource usage profile;
   determining, by the at least one computing device, whether to execute an encoder associated with the application in a first processor of the machine instance or in a second processor of the machine instance based at least in part on the resource usage profile of the application; and
   assigning, by the at least one computing device, the encoder and the application to be executed in the machine instance.

2. The non-transitory computer-readable medium of claim 1, wherein the resource usage profile indicates whether the application imposes a greater load on the first processor of the machine instance or a greater load on the second processor of the machine instance.

3. The non-transitory computer-readable medium of claim 1, wherein the method comprises:
   transferring, by the at least one computing device, execution of the encoder from the first processor of the machine instance to the second processor of the machine instance when the encoder is executing in the first processor and a first criteria is met; and
   transferring, by the at least one computing device, execution of the encoder from the second processor of the machine instance to the first processor of the machine instance when the encoder is executing in the second processor and a second criteria is met.

4. A system, comprising:
   at least one memory configured to store computer-readable instructions; and
   at least one computing device including a first processor and a second processor, the at least one computing device being configured, through execution of the computer-readable instructions, to:
   obtain a request to execute a first application in the at least one computing device;
   assign a second application to be executed in the first processor instead of the second processor when a resource usage profile associated with the first application indicates that the first application imposes a greater load to the second processor than to the first processor; and
   assign the second application to be executed in the second processor instead of the first processor when the resource usage profile indicates that the first application imposes a greater load to the first processor than to the second processor.

5. The system of claim 4, wherein the at least one computing device is further configured to assign the second application based at least in part on a current load of the first processor and a current load of the second processor.

6. The system of claim 4, wherein the at least one computing device is further configured to assign the second application based at least in part on a current load of the first processor, a current load of the second processor, and maximum thresholds for usage of the first processor and the second processor.

7. The system of claim 4, wherein the at least one computing device is further configured to assign the second application based at least in part on whether a current load of the first processor and a current load of the second processor differ from each other by a threshold.

8. The system of claim 4, wherein the at least one computing device is further configured to determine a resource usage status of the at least one computing device.

9. The system of claim 8, wherein the at least one computing device is further configured to assign the second application based at least in part on the resource usage status of the at least one computing device.

10. The system of claim 4, wherein the second application comprises a video encoder configured to encode a video signal into a video stream for the first application.

11. The system of claim 4, wherein the resource usage profile indicates whether the first application imposes a greater load on the first processor or a greater load on the second processor.

12. The system of claim 4, wherein the first application and the second application are executed with a virtualized environment including an operating system specific to the first application.

13. The system of claim 4, wherein the at least one computing device is further configured to execute a virtualization layer configured to transfer execution of the first application from the first processor to the second processor.

14. The system of claim 13, wherein the virtualization layer is further configured to reconfigure execution of the second application from the first processor to the second processor to accommodate the first application.

15. A method, comprising:
   obtaining, in at least one computing device, a request to execute a first application, the first application being associated with a resource usage profile;
   determining, in the at least one computing device, a current load of a first processor and a current load of a second processor; and
   assigning, in the at least one computing device, a second application for execution in the first processor or the second processor based at least in part on the resource usage profile associated with the first application, the current load of the first processor, and the current load of the second processor.

16. The method of claim 15, wherein the resource usage profile indicates whether the first application imposes a greater load on the first processor or a greater load on the second processor.

17. The method of claim 15, wherein, for the first application, the resource usage profile provides a consumption metric associated with the first processor and a consumption metric associated with the second processor.

18. The method of claim 15, wherein assigning the second application for execution comprises:
  assigning, in the at least one computing device, the second application for execution in the first processor when the current load of the second processor is above a maximum threshold for usage of the second processor and the resource usage profile indicates that the first application imposes a greater load on the second processor than on the first processor; and
  assigning, in the at least one computing device, the second application for execution in the second processor when the current load of the first processor is above a maximum threshold for usage of the first processor and the resource usage profile indicates that the first application imposes a greater load on the first processor than on the second processor.

19. The method of claim 15, wherein assigning the second application for execution comprises:
  assigning, in the at least one computing device, the second application for execution in the first processor when the current load of the first processor is below a maximum threshold for usage of the first processor and the resource usage profile indicates that the first application imposes a greater load on the second processor than on the first processor; and
  assigning, in the at least one computing device, the second application for execution in the second processor when the current load of the second processor is below a maximum threshold for usage of the second processor and the resource usage profile indicates that the first application imposes a greater load on the first processor than on the second processor.

20. The method of claim 15, further comprising reconfiguring execution of the second application from the first processor to the second processor to accommodate the first application.

\* \* \* \* \*